Feb. 5, 1929.  1,701,375
O. K. KJOLSETH
RAILWAY TRUCK
Filed Aug. 23, 1927
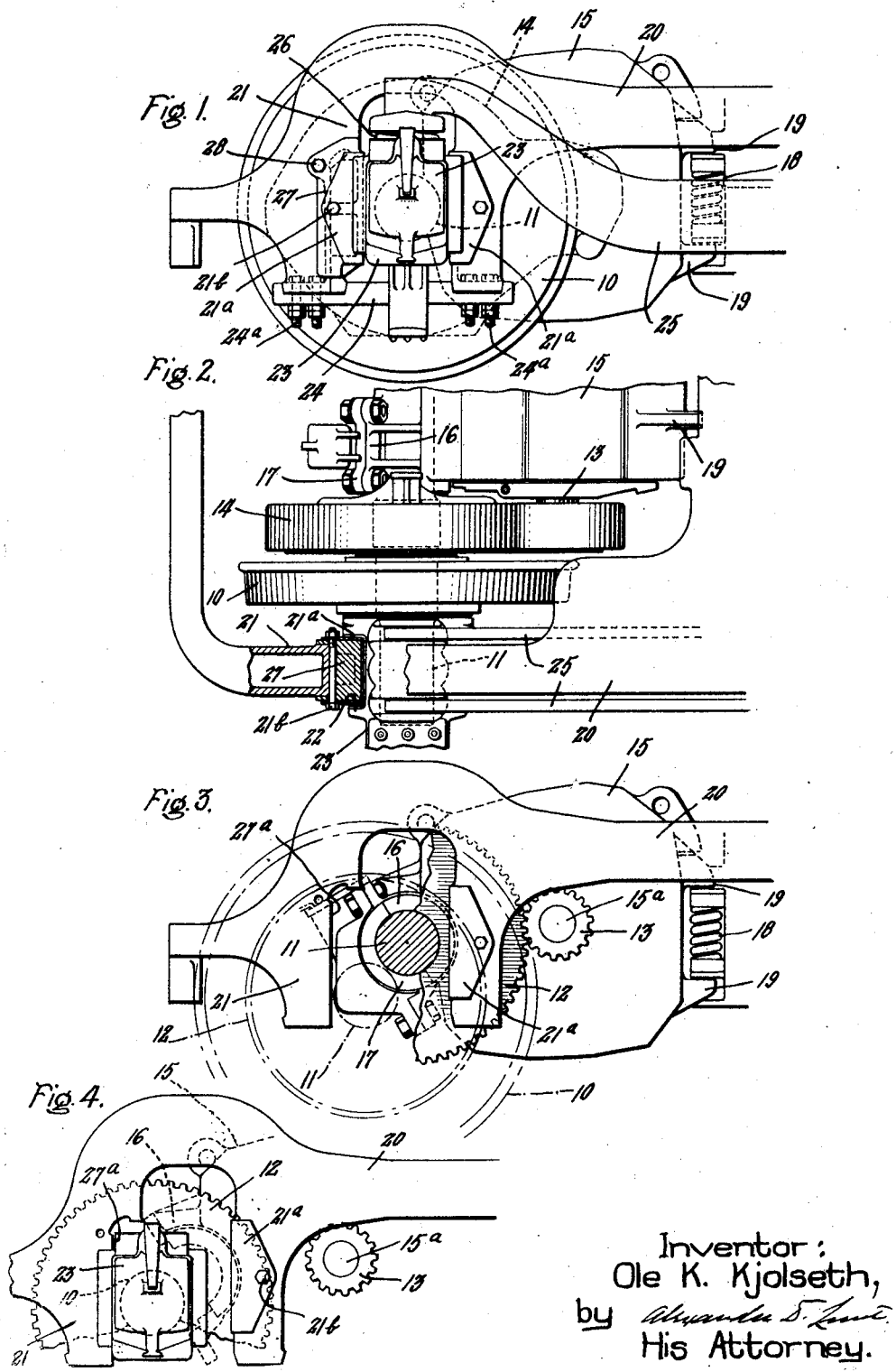
Inventor:
Ole K. Kjolseth,
by *[signature]*
His Attorney.

Patented Feb. 5, 1929.

1,701,375

UNITED STATES PATENT OFFICE.

OLE K. KJOLSETH, OF SCOTIA, NEW YORK, ASSIGNOR TO GENERAL ELECTRIC COMPANY, A CORPORATION OF NEW YORK.

RAILWAY TRUCK.

Application filed August 23, 1927. Serial No. 214,957.

My invention relates to railway trucks, and more particularly to trucks adapted to drive the locomotive or cars in which they are used.

During the operation of a locomotive or car the face of the truck wheels become worn or flattened so that it is necessary to remove the wheels and wheel axles to refinish the wheel faces. In removing the driving wheels and axles from trucks in which the motor frame is provided with a bearing on the axle it has been the practice, heretofore, to remove the motor and the axle as a unit, which necessitated disturbing the motor connections. Although the bearing on the motor frame arranged on the axles in these trucks has been a split bearing, the pedestal yokes have not been wide enough to permit the axle to be moved out of the half bearing on the motor after removal of the bearing cap and the journal boxes from the axle, so that the wheels and wheel axle could not be removed independently of the motor.

The object of my invention is to provide a construction such that in trucks having a motor frame provided with a split bearing on the wheel axle, the driving wheels and axle can be removed from the pedestal yokes, after removing the tie bars from the pedestal yokes and the pedestal yokes and the bearing cap from the wheel axle, without disturbing the motor, the motor connections, or the journal boxes. I do this by providing removable means in the truck structure, such that upon removal thereof the axle can be moved out of the bearing on said motor frame and away from the motor far enough to disengage the gear on the axle from the motor pinion after removal of the pedestal yoke tie bars and the bearing cap on the wheel axle and without removing the journal boxes or disturbing the motor and its connections.

My invention will be more fully set forth in the following description referring to the accompanying drawing and the features of novelty which characterize my invention will be pointed out with particularity in the claims annexed to and forming a part of the specification.

In the drawing Fig. 1 is a fragmentary side elevation of a truck embodying my invention; Fig. 2 is a plan view of the portion of the truck shown in Fig. 1; Fig. 3 is a side elevation of a portion of the truck shown in Fig. 1 partly broken away to more clearly show the construction, the wheels 10 and wheel axle 11 being shown in dotted lines in the position in which they can be lowered out of the truck pedestal; and Fig. 4 is a side elevation of a portion of the structure shown in Fig. 1, showing the wheel axle moved in the pedestal so that the wheels and wheel axle with the driving gear and journal boxes thereon can be removed.

Referring to the drawing, the truck in connection with which I have illustrated my invention comprises wheels 10 and wheel axle 11 having a driving gear 12 thereon. The wheels and wheel axle are driven by a pinion 13 engaging the gear 12, the gear and the pinion being enclosed by a gear casing 14. The pinion 13 is driven by a motor 15 which is supported at one side on the wheel axle with its shaft $15^a$ parallel thereto by the split bearing 16 on the motor frame provided with a removable bearing cap 17. The other side of the motor is yieldably supported by springs 18 arranged between lugs 19 on the motor frame and supported from the truck frame. Although the truck frame may be of any suitable form, it is shown in the drawing, for convenience in illustration, as comprising side frames 20 having pedestal yokes 21 slidably engaging the guide ways 22 in the journal boxes 23 and provided with removable shoes $21^a$ which may be renewed when their surfaces become worn. The pedestal yokes are reinforced by tie bars 24 which are bolted at $24^a$ to each side thereof. The truck frame is supported on the axles by equalizers 25 which are spring supported at 26 on the journal boxes, the truck frame including the side frames 20 spring supported on the equalizer.

In operation of the locomotive or car in which this truck is used the wheel faces become worn or flattened and it is then necessary to remove the wheels and axle for the purpose of refinishing the wheel faces. The removal of the wheels and axle without disturbing the motor or its connections is facilitated in this structure, in accordance with my invention, by providing removable means in the truck structure which in this instance comprises removable spacers 27 which are bolted at 28 in the widened portion $27^a$ of the jaws of the pedestal yokes 21 on both sides of the truck frame, and having one of the shoes $21^a$ in each pedestal yoke bolted thereto so that it is not necessary to remove the spacers and shoes separately from the pedestal yoke. The spacers 27 are arranged on the opposite sides of the wheel axle 11 from the motor 15, and are of such width that after the spacers, the gear case 14 and the bearing cap 17 are removed the wheels and wheel axle with the gear and journal boxes thereon can be moved from the position shown in Fig. 1, in which the wheel axle is in the bearing on the motor frame and the gear 12 is in engagement with the pinion 13, to the position shown in Fig. 4, in which the wheel axle is out of the half of the bearing 16 on the motor 15 and the gear is out of engagement with the pinion 13. When the wheels and wheel axle are moved to the position shown in Fig. 4 as the wheel axle 11 is out of the half of the bearing 16 on the motor frame 15 and the driving gear 12 is out of engagement with the motor pinion 13, the wheels and the wheel axle with the driving gear and journal boxes can be lowered out of the pedestal yokes.

When it is desired to remove the wheel axle from the truck, the motor 15 is supported in any suitable manner, as for example by arranging blocks thereunder, and the equalizer 25 is jacked up to release the springs 26 so that the weight on the truck is supported independently of the axles. The gear case 14 and the bearing cap 17 are removed so that the axle can be moved out of the half of the bearing on the motor frame 15 and the gear 12 can be moved out of engagement with the pinion 13 without disturbing the motor or its connections. The spacer 27 and tie bar 24 are then removed and the wheels and axle with the gear and journal boxes thereon are moved from the position shown in Fig. 1 to the position shown in Fig. 4 so that the axle is out of the half of the bearing 16 on the motor frame and the gear 12 is out of engagement with the motor pinion 13, so that the wheels and axle with the gear 12 and journal boxes 23 thereon can be lowered out of the pedestal yokes 21 in any convenient manner.

It is apparent that modifications will occur to those skilled in the art of the form of my invention herein disclosed. I desire it to be understood, therefore, that my invention is not limited to the particular arrangement described and I intend in the appended claims to cover all modifications which do not depart from the spirit and scope of my invention.

What I claim as new and desire to secure by Letters Patent of the United States is:

1. In a driving truck for a locomotive or car having an axle with wheels and a driving gear thereon, journal boxes on said axle, a frame having pedestal yokes engaging said journal boxes, means for driving said truck comprising a motor supported on said frame and having a pinion engaging said gear, a split bearing on said motor having a removable cap and being adapted to engage said axle, and a removable spacer between the jaws of each of said pedestal yokes and the journal box engaged by the same, said spacer being of sufficient width to permit said axle and journal box to be moved away from said pinion far enough to disengage said gear from said pinion and move said axle out of said bearing when said bearing cap and said spacer are removed so that the wheels and axle with the journal boxes thereon can be removed from the pedestal yokes without disturbing said motor.

2. In a driving truck for a locomotive or car having an axle with wheels and a driving gear thereon, journal boxes on said axle, a frame having pedestal yokes engaging said journal boxes, means for driving said truck comprising a motor supported at one side on said frame and having a pinion engaging said gear, a split bearing on the other side of said motor having a removable cap and being arranged on said axle, and a removable spacer carried by the jaw of each of said pedestal yokes on the side of said axle opposite said pinion, said spacer being of sufficient width to permit said axle and journal box to be moved away from said pinion far enough to disengage said gear from said pinion when said spacer is removed so that the wheels and axle can be removed from the pedestal yokes without disturbing said motor or pinion.

3. In a driving truck for a locomotive or car having an axle with wheels and a driving gear thereon, journal boxes on said axle, a frame having pedestal yokes engaging said journal boxes, means for driving said truck comprising a motor supported at one side on said frame, a split bearing on said motor for supporting the other side thereof, said motor having a shaft parallel with said axle and a pinion thereon engaging said gear, and a removable spacer carried by the jaw of each of said pedestal yokes on the side of said axle opposite said pinion, said spacer being of sufficient width to permit said axle and journal boxes to be moved away from said pinion far enough to disengage said gear from said pinion and to move said axle out of said bearing when said bearing cap and said spacer are removed so that the wheels and axle with the journal boxes thereon can be removed from the pedestal yokes without disturbing said motor.

In witness whereof, I have hereunto set my hand this 20th day of August, 1927.

OLE K. KJOLSETH.